(12) United States Patent  (10) Patent No.: US 7,520,276 B2
Jakobsson et al.  (45) Date of Patent: Apr. 21, 2009

(54) PORTABLE WORKING MACHINE

(75) Inventors: Anders Jakobsson, Hjo (SE); Anders Köhler, Landvetter (SE); Anders Reuterberg, Lerum (SE); Niklas Sundberg, Alingsås (SE)

(73) Assignee: Aktiebolaget Electrolux, Stockholm (SE)

( * ) Notice: Subject to any disclaimer, the term of this patent is extended or adjusted under 35 U.S.C. 154(b) by 65 days.

(21) Appl. No.: 10/581,105

(22) PCT Filed: Dec. 9, 2003

(86) PCT No.: PCT/SE03/01923

§ 371 (c)(1),
(2), (4) Date: Aug. 10, 2006

(87) PCT Pub. No.: WO2005/056225

PCT Pub. Date: Jun. 23, 2005

(65) Prior Publication Data

US 2007/0199554 A1  Aug. 30, 2007

(51) Int. Cl.
*B28D 1/04* (2006.01)
(52) U.S. Cl. .................... 125/13.01; 451/344
(58) Field of Classification Search ............. 125/13.01, 125/12; 451/344, 538; 30/264
See application file for complete search history.

(56) References Cited

U.S. PATENT DOCUMENTS 4,188,935 A * 2/1980 Tubesing ................. 125/13.01
4,475,487 A 10/1984 Fukuoka et al.
5,317,997 A 6/1994 Tomitaku
5,438,965 A 8/1995 Aronsson et al.
5,940,976 A * 8/1999 Soderqvist et al. ............ 30/390
6,039,037 A * 3/2000 Taomo et al. ............. 125/13.01
6,374,501 B1 * 4/2002 Claesson ..................... 30/389
6,546,631 B2 * 4/2003 Iida et al. ..................... 30/124
6,591,826 B1 * 7/2003 Donnerdal ............... 125/13.01
6,916,236 B2 * 7/2005 Terpstra ..................... 451/358
2001/0003983 A1 6/2001 Iida et al.

* cited by examiner

*Primary Examiner*—Dung Van Nguyen
(74) *Attorney, Agent, or Firm*—Pearne & Gordon LLP

(57) ABSTRACT

A portable working machine comprising a tool unit (1) with a disc guard and a circular tool (3), and a machine unit (2) with a filter system (10), an internal combustion engine (11) with an engine cylinder (13) with bore (12) having a centre line (30), a crankshaft (14) and a crankcase (15), a fuel tank (17), a muffler (18) with an entrance port (46) provided in the rear side of the muffler and facing an exhaust port (47) of the cylinder, handles (19, 20) controls (21, 22) and supports (23, 24) on the underside of the machine unit for allowing upright positioning of the machine on a flat ground. The cylinder bore (12) is inclined forwards in a direction towards the tool unit, such that the centre line (30) of the cylinder bore forms a tilt angle larger than zero, in the direction, to a perpendicular to any or both of the following lines: (a) a base line (33) which is a line coinciding with a horizontal surface on which the machine is resting in an upright position, when the supports on the underside of the machine unit contact the surface, and (b) a tangential line (33') extending from a peripheral point of the tool, on the lower part of the tool when the machine has an upright position, to the bottom side of a rear support of the machine unit.

29 Claims, 6 Drawing Sheets

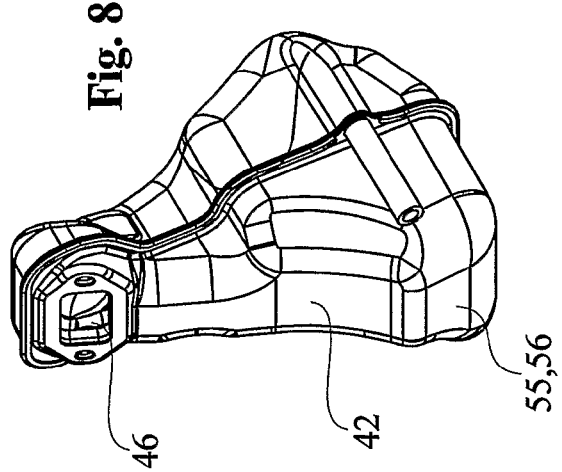
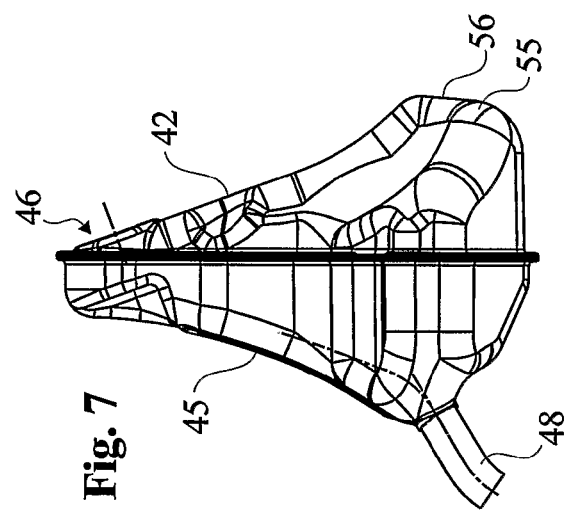
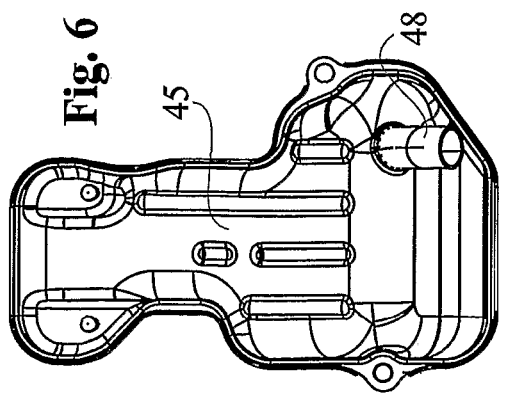

PORTABLE WORKING MACHINE

TECHNICAL FIELD

The present invention relates to a portable working machine comprising a tool unit with a circular, disc-shaped tool, which can be rotated about an axis of rotation, which is horizontal in the normal upraised position of the machine, and a machine unit, which includes at least a filter system, which is at least partly accommodated in a top part of the machine unit, an internal combustion engine with an engine cylinder with bore having a centre line, a crankshaft and a crankcase, an assembly comprising members for supplying air and fuel to the engine, a fuel tank, a muffler, handles and controls, and preferably supports on the underside of the machine unit for allowing upright positioning of the machine on a flat ground, and a power transmission between the machine unit and the tool unit.

BACKGROUND OF THE INVENTION

Portable working machines of the above defined type are known since long. They are often used for cutting concrete and similar materials. The cutting creates a lot of abrasive dust. Without air filtration the engine will wear out in less than half an hour of operation. Efficient filters are therefore vital and are attained mainly through a big filter volume. An increased filter volume will increase the service life of the machine. For example, a machine of this type is described in U.S. Pat. No. 5,438,965. This machine, its precursors and successors, belonging to the applicant's "Partner® K650-family", and variants of it, have been and are still widely used in the construction industry for cutting concrete and the like, and also by fire brigades for cutting holes in roofings or for penetrating vehicle wrecks, and similar tasks. It has a rear handle protruding backwards from the machine unit. This ensures a long distance between front and rear handles enabling a comfortable and precise control of the machine. This is an advantage compared to a similar type of machine that instead has its rear handle protruding upwards from the machine unit and therefore has a much shorter distance between the handles. However the machine described in U.S. Pat. No. 5,438,965 also has some shortcomings, which mainly have to do with a traditional thinking as far as the general layout of the machine unit is concerned. For example, the engine cylinder with its bore is conventionally inclined somewhat rearwards relative to a base line of the entire machine and/or to the bottom of the machine unit. This tends to limit the available space for other important components of the machine unit, such as an assembly which comprises members for supplying air and fuel to the engine, including a carburetor and a filter system for a given overall machine length. This in turn restricts the possibilities to give the said components an appropriate design and shape.

BRIEF DISCLOSURE OF THE INVENTION

It is the purpose of the invention to address the above complex of problems. To that end, according to a first aspect of the invention, the cylinder and its bore is inclined forwards in a direction towards the tool unit, such that the centre line of the cylinder bore forms a tilt angle larger than zero, in said direction, to a line which is perpendicular to any or both of the following lines:

a) a base line, which is a line coinciding with a horizontal surface on which the machine is resting in an upright position, when said supports on the underside of the machine unit contact said surface, and b) a tangential line extending from a peripheral point of the tool, on the lower part of the tool when the machine has an upright position, to the bottom side of a rear support of the machine unit.

Preferred or recommended tilt angles are specified in appending, independent claims.

According to another aspect of the invention, a front side of the engine, including the front side of the cylinder and the front side of the crankcase, as seen in a plane through the centre line and perpendicular to the axis of rotation of the tool, lies in an inclined plane which is substantially parallel with the inclined centre line of the engine cylinder. The muffler is accommodated in a space which has the substantial shape of a triangle in a cross section of said space perpendicular to said axis of rotation and located behind a disc guard, which triangle has one corner pointing upwards when the machine has an upright position, a front side facing the tool unit, a rear side, at least a top part of which is facing said inclined front sides of the cylinder block and the crankcase, and a base which faces said base line. The said space may be comparatively large and may be substantially occupied by the muffler, which allows the muffler to be afforded a sufficient size and a suitable design, which may make the muffler more efficient than is possible in existing machines of the present type, as far as sound attenuation is concerned.

Another way of describing the tilt of the engine and the related design and accommodation of the muffler is to state that a line extending between and defined by the foremost point of the muffler and the foremost point of the machine unit forms an angle $\delta$ to the centre line of the cylinder bore, which angle $\delta$ amounts to 10-45 degrees, preferably 15-30 degrees.

A preferred design and positioning of the muffler are stated in the appending claims.

Another aspect of the invention concerns the design and positioning of the fuel tank in the machine unit. According to a preferred embodiment, a rear bottom part of the muffler extends rearwards under the crank case, while a front bottom part of the fuel tank extends forwards under the crank case, where said front side of the fuel tank faces the rear side of the lower part of the muffler. According to the same embodiment, a heat insulation is provided in a gap between said front and rear sides of the fuel tank and muffler, respectively. Further, said embodiment also allows the accommodation of the crankcase above said rearward and forwards extending parts of the muffler and the fuel tank, respectively. Further the muffler, according to an aspect of the invention, has a forwards inclined side, while the fuel tank has a front, rearwards inclined size, such that the crank case can be accommodated between said inclined sides, above said rearwards and forwards projecting parts of the muffler and fuel tank, respectively. These arrangements means a very efficient utilization of available spaces for the accommodation of the muffler, the cylinder block, the crankcase and the fuel tank, which increases the space, which is available between a rear wall of the machine unit and the inclined cylinder for other functional components of the machine unit. This space, according to still another aspect of the invention, is utilized for the accommodation of the said assembly for supplying air and fuel to the engine, and it also allows improvements as far as the design of this assembly is concerned. Also at least part of the filter system, particularly a main filter, may be accommodated in said space. This means that the total filter volume can be increased thereby increasing service life of the engine, or that the machine can be made shorter and therefore easier to handle in a narrow space like a trench for a pipe to be cut. Assuming then a specific filter volume to be used. Improvements of said unit for supplying air and fuel to the engine may include any or all of the following features: placing the carburetor at a comparatively long distance from the cylinder, i.e. placing it "cold" which improves the restart of the engine in hot conditions; and employment of airhead technique, which reduces the emission of pollutions with the exhaust gas from two-stroke engines. In this connection it shall be stated that the employment of airhead technique is favourable but an option, not a prerequisite of the invention. Conventional two-stroke combustion engines may be used as well, and even four-stroke combustion engines.

Other aspects, achievements and characteristic features of the invention are apparent from the appending claims and from the following description of a preferred embodiment of the invention.

BRIEF DESCRIPTION OF THE DRAWINGS

In the following description of a preferred embodiment, reference will be made to the accompanying drawings, in which.

FIG. 6 shows a muffler as viewed from the front;

FIG. 7 is a side elevation of the muffler as viewed along the line VII-VII in FIG. 6; and FIG. 8 is a perspective view of the muffler as viewed obliquely from the right and from the rear.

DESCRIPTION OF THE PREFERRED EMBODIMENT

Figure 1:
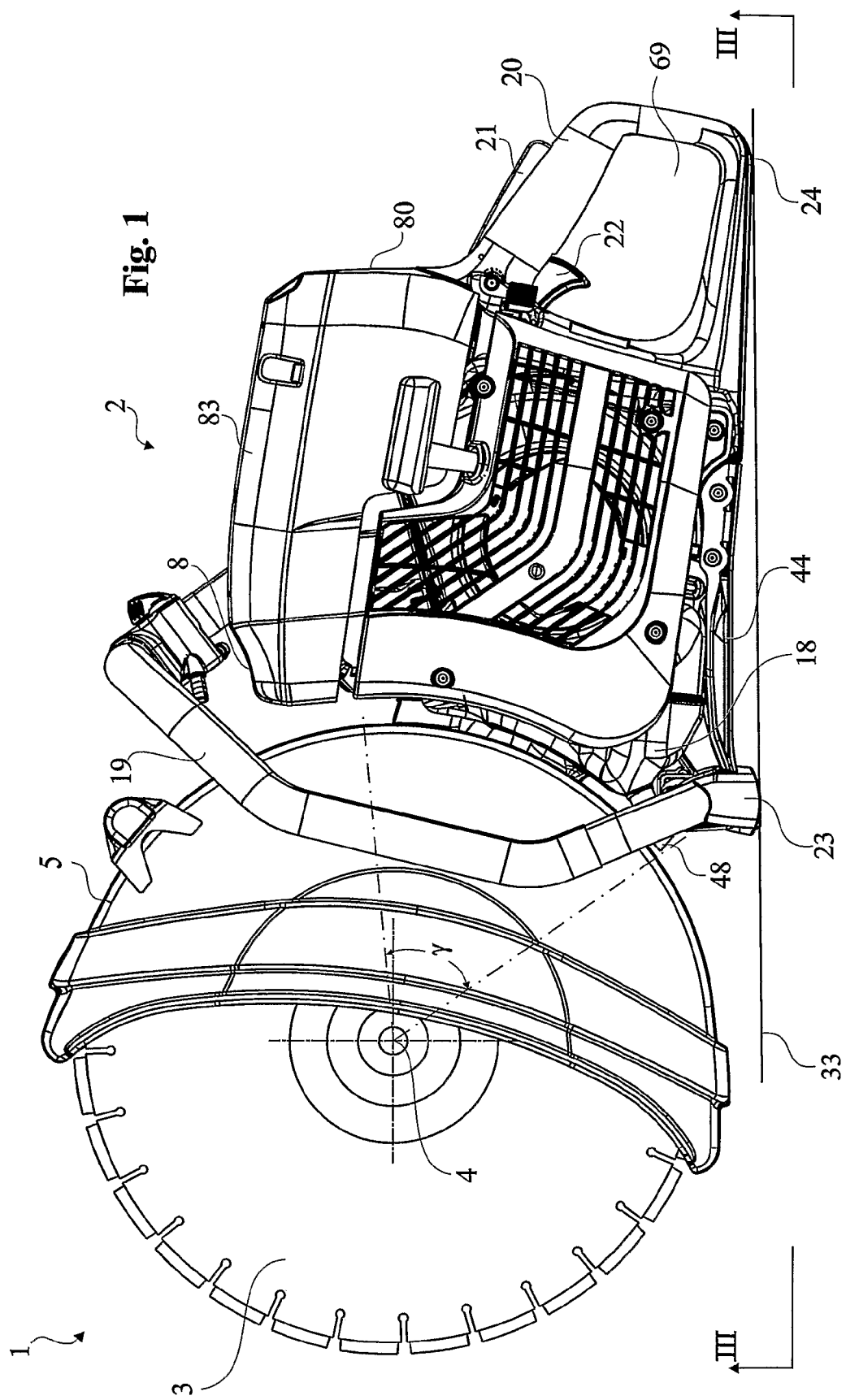
FIG. 1 is a side elevation of the portable working machine according to the preferred embodiment of the invention as viewed from the left.
Figure 2:
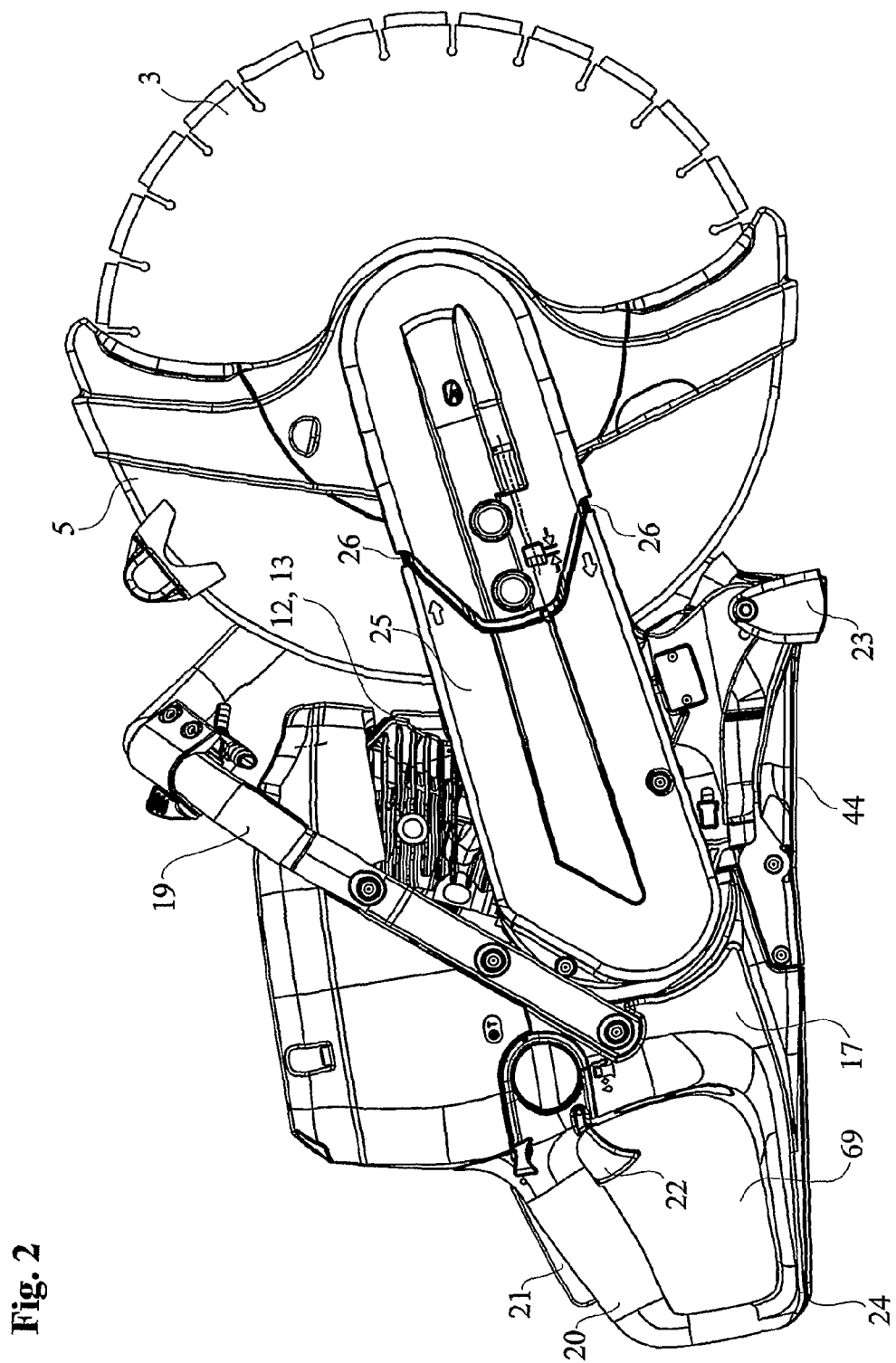
FIG. 2 is a side elevation of the machine as viewed from the right.
Figure 3:
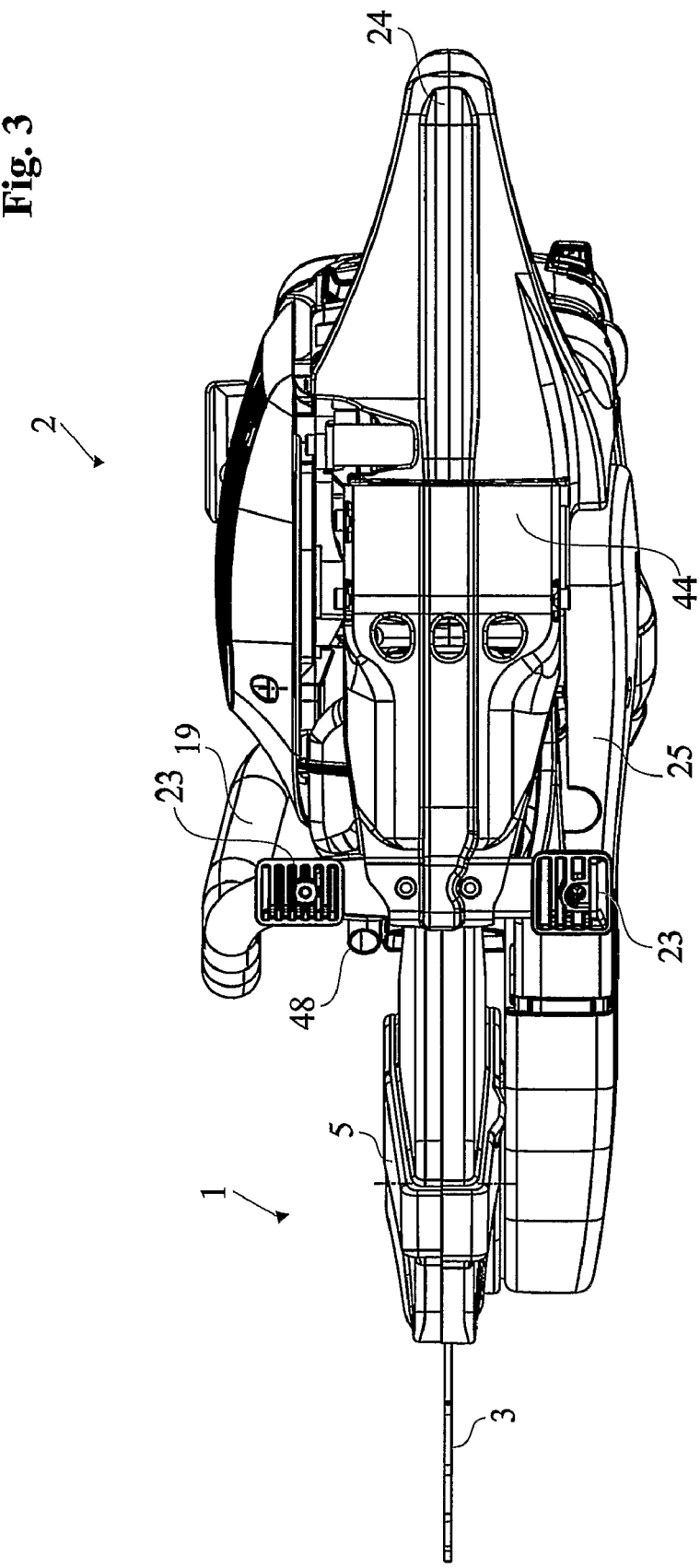
FIG. 3 is a bottom view of the machine along the line III-III in FIG. 1.

The portable working machine shown in FIG. 1-FIG. 3 comprises a tool unit 1 and a machine unit 2. A rear part of the machine is where handle 20 with controls 21, 22 is located. The tool unit 1 is provided with a circular disc shaped tool 3 in the form of a diamond equipped cutter disc, which can be rotated about an axis of rotation 4, which is horizontal in the normal upraised position of the machine, as shown in FIG. 1 and FIG. 2. A disc guard is designated 5.

Figure 5:
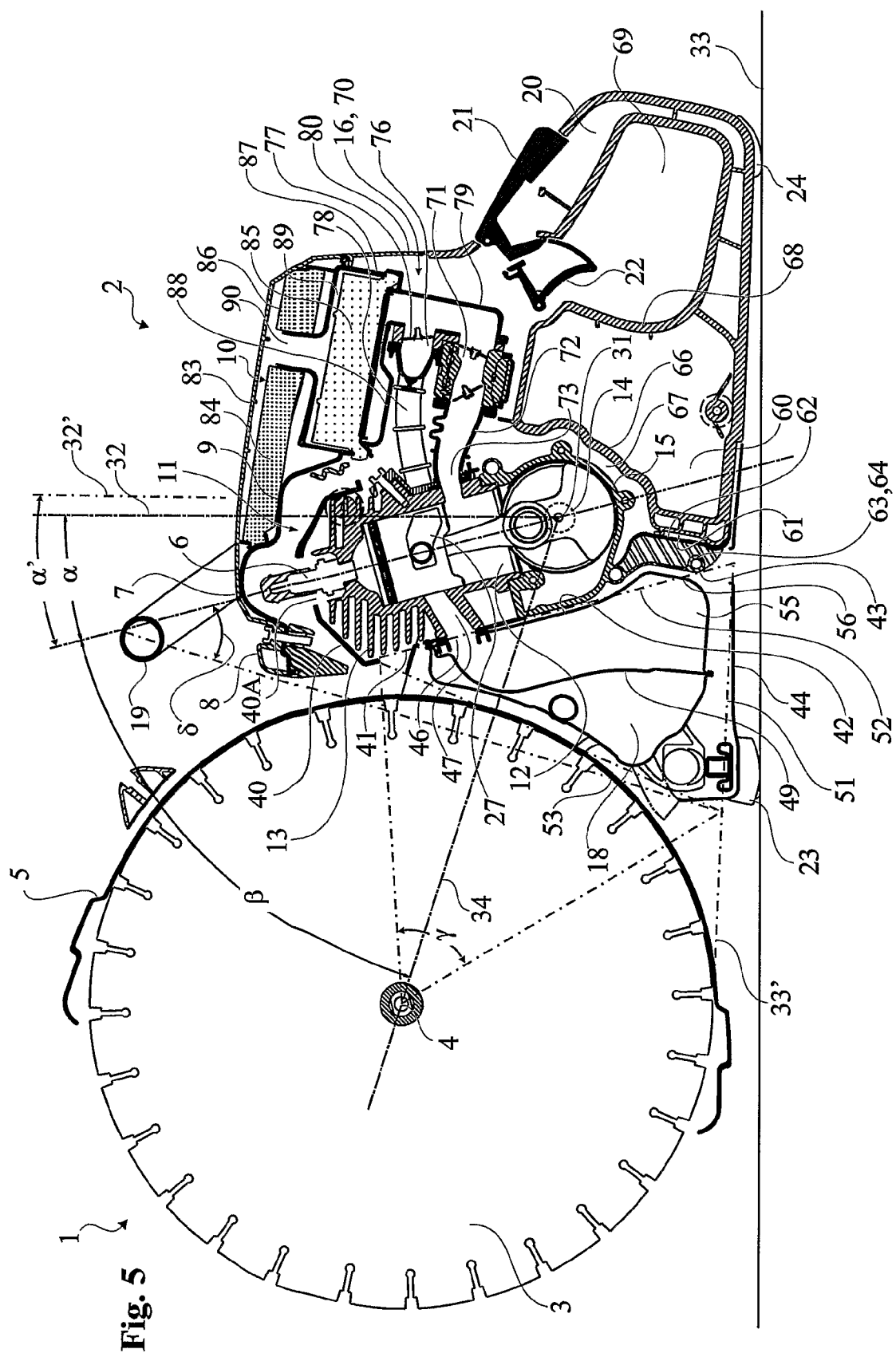
FIG. 5 shows the machine in a longitudinal cross section along the line V-V in FIG. 4, partly schematically.

The machine unit 2, FIG. 5, includes a filter system 10, a two-stroke internal combustion engine 11 with an engine cylinder 13 with a cylinder bore 12, a crankshaft 14 and a crankcase 15, an assembly 16 for supplying air and fuel to the engine, a fuel tank 17, a muffler 18, handles 19, 20, controls 21, 22, and supports 23, 24 on the underside of the machine unit 2 for allowing upright positioning of the machine on a flat ground. A tool carrier (cutter arm) 25, FIG. 2, unites the machine unit 2 and the tool unit 1. An endless driving belt 26 transmits the power from the machine unit 2 to the cutter disc 3 in a manner known per se.

Figure 4:
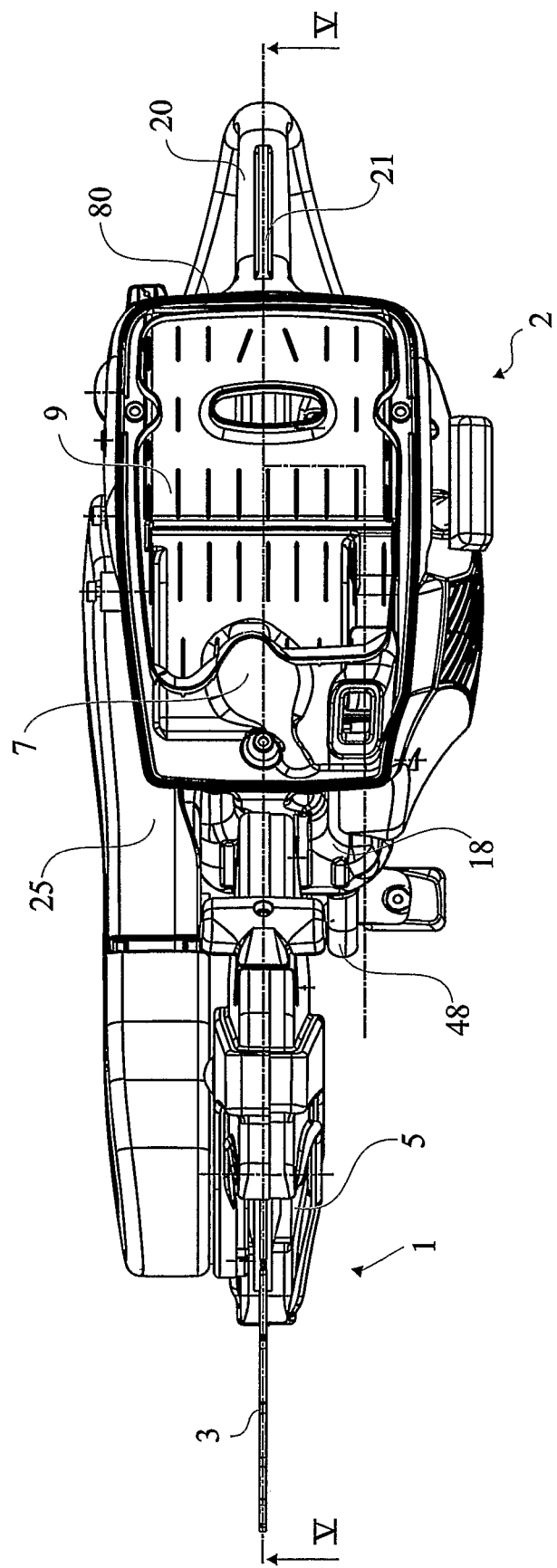
FIG. 4 is a top view of the machine, a top cover being removed.

The centre line 30 of the engine cylinder 12 coincides with the axis of rotation 31 of the crankshaft 14 and with the central, longitudinal, vertical plane which corresponds to the view along the line V-V in FIG. 4. The cylinder 13 and the crankcase 15 are tilted forwards. The tilt angle α between the centre line 30 of the engine cylinder and a perpendicular 32 to a base line 33 or base plane amounts to 15 degrees according to the embodiment. The base plane 33 is the horizontal plane on which the front and rear supports 23 and 24 of the machine unit are resting as shown in FIG. 5. It should be understood that the reference to the base line/plane 33 in order to describe the degree of tilt of the cylinder 13 and the crankcase 15 presupposes that the height of the supports 23 and 24 are moderate. If the front supports 23 would be much higher than the rear support 24, e.g., if the front supports would consist of long, unfoldable legs, while the rear support is just a heel of no or negligible height, the above definition of the tilt angle α does not provide true information about the degree of tilt of the engine cylinder and crankcase assembly. In this case therefor, reference is instead made to a line 33', which is a tangential line extending from a peripheral point of the cutter disc 3, on the lower part of the cutter disc when the machine has an upright position, to the bottom side of the rear support 24 of the machine unit. It should in this connection also be understood the rear support need not consist of a protrusion in the form of a heel or the like, but may as well consist of just a piece of the bottom of the machine unit, which contacts the ground or base plane 33. The angle of tilt, α', between the centre line 30 and a perpendicular 32' to the tangential line 33', is about 18 degrees.

Assuming that the axis of rotation 31 of the crankshaft 14 is located at a level above the base plane 33, which level does not particularly deviate from what is normal practice in working machines of the present type, also the line 34, which extends between the axis of rotation 4 of the cutter disc 3 and the axis of rotation 31 of the crankshaft 14, can be used as a reference line for describing the degree of tilt of the engine 11. According to the embodiment, the angle β of inclination between the centre line 30 of the engine cylinder 12 and the said connection line 34 is about 58 degrees.

The top of the cylinder 13 is covered by a cap 40 for directing cooling air to the cooling fins of the cylinder. A front part of the cap 40 and a section of the cylinder 13 beneath the cap 40 face the tool unit 1 at a moderate distance from the disc guard 5. The spark plug 6 of the engine extends through a hole 40A in the top of the cap and is pointing obliquely up in the very front top corner 8 of the machine unit 2, where the top and the front side of the machine unit meet, covered by a cupola-like elevation 7 in the front part of a filter bottom 9, included in the filter system 10.

The front side 41 of the tilted engine 11 (the cylinder 13 and the crankcase 15) is parallel with the inclined centre line 30 of the cylinder bore 12. The front side 41, in other words, is also inclined, such that it forms an angle of 75 degrees to the horizontal plane. A protrusion 43 on the crankcase projects downwards, approximately in a direction such that it forms an extension of the front side 41 of the engine 11. A bottom plate of the machine unit 2 is designated 44.

The space above the front part of bottom plate 44, between the engine 11 and the disc guard 5 has the substantial shape of a triangle. A first side 51 is defined by the front part of the base plate 44. A second side 52 is defined by the front side 41 of the engine and the front side of the protrusion 43. Finally, the third side 53 of the conceived triangle is defined by a section of the cutting blade guard, corresponding to a sector angle γ, FIG. 5, of about 60 degrees according to the embodiment. The considerable space, which is available in the longitudinal direction between the engine 11 and the tool unit 1, represented by the said conceived triangle, is due to the tilt of the engine 11 according to the invention. Also the available space in the cross direction is considerable.

According to an aspect of the invention, the muffler 18 is accommodated in the above discussed, approximately triangular space, and is designed such that it will substantially occupy this space. The resulting shape of the muffler, in a cross section of the muffler, corresponding to the central, longitudinal, vertical section of the machine, can also be described as the shape of a longitudinal section of a pear, FIG. 5, FIG. 7 and FIG. 8.

A major part of a rear side 42 of the muffler is parallel with the second side 52 of the conceived triangle. The bottom section of the muffler 18 widens forward as well as rearwards, including a bottom part 55 which extends rearwards under the crankcase 15 towards the protrusion 43. A rear side 56 of the bottom part 55 faces the protrusion 43. The concave front side 45 of the muffler 18 runs parallel with the disc guard 5 within a major part of the sector angle γ, adjacent to the third side 53 of the conceived triangle.

An entrance port 46 is provided in the rear side 42 of the muffler, in "the tip of the pear", facing an exhaust port 47 of the cylinder. This is a convenient location of the entrance port. From the tip portion of the muffler, the exhaust gases are directed down into the voluminous body of the muffler. There is a smooth turn of the gas flow down into a first section of the muffler divided by baffle 49. This smooth turn results in a comparatively low pressure loss. The exhaust gas leaves the second section of the muffler through an exhaust pipe 48 in the bottom, left part of the muffler.

The pear-like shape of the muffler in the section shown in FIG. 5 also means that the contour of the muffler in said cross section has a point of balance (centre of gravity) in the main bottom part of the muffler, i.e. at a fairly low level. As a matter of fact, the point of balance of the muffler will adopt a position well below the level of the axis of rotation of the crankshaft, and even below the entire crankcase, when the machine is in an upright position. This feature indicates that the muffler indeed is located at a level in the machine which is unconventionally low.

The fuel tank 17, which is made of an impact resistant plastic material, has a design in a longitudinal, vertical cross-section, which—mirror-invertedly—has great similarities with that of the muffler 18. Thus the fuel tank has a front bottom part 60 which extends forwards under the crankcase 15. A metal plate 62 is provided in front of the front side 61 of the front bottom part 60. The plate 62 and the protrusion 43 are parallel, forming a gap 63 between them. The gap 63 has a sufficient width, when filled with a heat insulating material 64, to provide efficient heat insulation between the hot muffler 18 and the fuel tank 17. A concave wall portion of the fuel tank facing the crankcase 15, and following the contour thereof, is designated 66. The inclined wall 42 of the muffler and the concave wall 66 of the fuel tank define between them a space 67, tailored for the crankcase 15. A rear wall 68 of the fuel tank is also concave, defining the front of a space 69, which is a fair size for readily receiving a foot of an operator, who is going to start the engine.

Above the fuel tank 17 there is a space 70, which also is a good size, especially in the longitudinal direction, due to the inclination of the engine 11. The assembly 16 for the supply of air and fuel to the engine 11 is accommodated in this space 70, between the fuel tank 17 and the filter system 10. The assembly 16 includes a carburetor 71 and an intake pipe 72 extending between the carburetor and an induction port 73 of the cylinder. The engine 11, according to the preferred embodiment, is a crankcase scavenged two-stroke internal combustion engine employing air head technique. Therefor, the cylinder 13 is provided with transfer ducts (not shown), which have ports in the engine's cylinder wall, and therefore the assembly 16 also includes an air inlet 76 equipped with a restriction valve 77 and two parallel connecting ducts 78 leading to connecting ports in the cylinder wall and via piston recesses to the transfer channels. So called reed valves could also be used. Additional air is therefore supplied to the transfer channels from the air inlet 76 via at least one connecting duct 78 located in the vicinity of the intake pipe 72. The tilted cylinder is an advantage considering the extra space available for filters and intake system.

The carburetor 71, which is of a conventional type including a gas valve and a choke valve, the air inlet 76 with the restriction valve 77, the intake pipe 72 and the connecting ducts 78 are assembled and mounted on a bracket 79. The bracket 79 in turn is mounted in a rear part of the space 70, near a rear wall 80 of the machine unit. This—and the considerable longitudinal extension of the space 70, which is promoted by the inclination of the cylinder 13—allows the carburetor 71 to be located at a fairly long distance from the cylinder 13, and also allows the connecting ducts to be fairly long. Both these features are important. A "cold" location of the carburetor at quite a distance from the hot cylinder promotes good hot restart performance of the engine, and long connecting ducts promote a proper functioning of the airhead technique.

In the filter system 10, the filter bottom 9 is covered by a top cover 83. In an upper filter chamber 86 between the top cover 83 and the filter bottom 9, a pre-filter 84 is provided at the rear of the cupola 7, extending all the way from the cupola 7 to the rear top corner of the machine unit 2. The pre-filter 84 consists of oil-filled foamed plastic. A main filter 85 is provided under the rear part of the filter bottom 9, enclosed in a lower filter chamber 89 by the filter bottom 9, a frame 87 which extends downwards from the filter bottom 9, and a horizontal part 88 of the bracket 79. The upper and lower filter chambers 86 and 89 communicate via a passage 90 through the filter bottom 9.

LIST OF REFERENCE NUMERALS

1 tool unit
2 machine unit
3 tool
4 axis of rotation
5 disc guard
6 spark plug
7 cupola
8 front top corner
9 filter bottom
10 filter system
11 engine
12 cylinder bore
13 engine cylinder
14 crankshaft
15 crankcase
16 assembly for air and fuel
17 fuel tank
18 muffler
19 front handle
20 rear handle
21 control
22 control
23 front supports
24 rear support
25 cutter arm/tool carrier
26 driving belt
27 piston recess
28 vacant
29 vacant 30 centre line
31 axis of rotation of crankshaft
32 perpendicular
32' ditto
33 base line/plane
33' tangential line
34 connecting line
35 vacant
36 vacant
37 vacant
38 vacant
39 vacant
40 cap (40A hole)
41 front side of engine
42 rear side of muffler
43 protrusion
44 bottom plate
45 front side of muffler
46 entrance port
47 exhaust port
48 exhaust pipe
49 baffle
50 vacant
51 first side of triangle
52 second side
53 third side
54 vacant
55 protruding bottom part
56 rear side of protrusion 55
57 vacant
58 vacant
60 Front bottom part
61 Front side
62 Metal plate
63 Gap
64 Heat insulation
65
66 Concave wall
67 Space for crankcase
68 Rear wall
69 Space for foot
70 Space for assembly 16
71 Carburetor
72 Intake pipe
73 Port
74 Ports
75
76 Air inlet
77 Restriction valve
78 Connecting ducts
79 Bracket
80 Rear wall
81
82
83 Top cover
84 Pre-filter
85 Main filter
86 Upper filter chamber
87 Frame
88 Horizontal part of bracket
89 Lower filter chamber
90 Passage

The invention claimed is:

1. Portable working machine comprising a tool unit (1) with a disc guard (5) and a circular, disc-shaped tool (3), which can be rotated about an axis of rotation (4), which is horizontal in the normal upraised position of the machine, and a machine unit (2), which includes at least a filter system (10), which is at least partly accommodated in a top part of the machine unit, an internal combustion engine (11) with an engine cylinder (13) with bore (12) having a centre line (30), a crankshaft (14) and a crankcase (15), as assembly (16) comprising members for supplying air and fuel to the engine, a fuel tank (17), a muffler (18) accommodated in a space located behind the disc guard (5) where the space has the substantial shape of a triangle in a cross section of said space perpendicular to said axis of rotation (4), with an entrance port (46) provided in the rear side (42) of the muffler and facing an exhaust port (47) of the cylinder (13), i.e. the muffler is directly mounted to the cylinder, handles (19, 20), controls (21, 22), and supports (23, 24) on the underside of the machine unit for allowing upright positioning of the machine on a flat ground, and a tool carrier (25) unites the machine unit (2) and the tool unit (1) having a power transmission between the machine unit and the tool unit, comprising an endless driving belt (26), characterised in that the cylinder bore (12) is inclined forwards in a direction towards the tool unit, such that the centre line (30) of the cylinder bore forms a tilt angle (α) larger than zero, in said direction, to a perpendicular to any or both of the following lines: a) a base line (33), which is a line coinciding with a horizontal surface on which the machine is resting in an upright position, when said supports on the underside of the machine unit contact said surface, and b) a tangential tine (33') extending from a peripheral point of the tool, on the lower part of the tool when the machine has an up right position, to the bottom side of a rear support (24) on the machine unit.

2. Machine according to claim 1, characterised in that the tilt angle to said perpendicular to the base line is 5-40 degrees.

3. Machine according to claim 2, characterised in that the tilt angle to said perpendicular to the base line is 5-30 degrees.

4. Machine according to claim 3, characterised in that the tilt angle to said perpendicular to the base line is 10-20 degrees.

5. Machine according to claim 1, characterised in that the tilt angle to said perpendicular to the tangential line is 7-40 degrees.

6. Machine according to claim 5, characterised in that the tilt angle to said perpendicular to the tangential line is 7-30 degrees.

7. Machine according to claim 6, characterised in that the tilt to angle to said perpendicular to the tangential line is 10-25 degrees.

8. Machine according to claim 1, characterised in that the tool carrier (25) is arranged on the right hand side of the machine as seen from above.

9. Machine according to claim 1, characterised in that the centre line of the engine cylinder forms an angle of inclination (β) to a connection line (34) between the axis of rotation (4) of the tool and the axis of rotation (31) of the crankshaft, said angle of inclination being smaller than 80 degrees.

10. Machine according to claim 9, characterised in that said angle of inclination to said connection lines is 45-70 degrees.

11. Machine according to claim 10, characterised in that said angle of inclination to said connection line is 50-65 degrees.

12. Machine according to claim 1, characterised in that front side (41)s of the engine (11) as seen in a plane through the centre line (30) and perpendicular to the axis of rotation (4) of the tool (3) lies in an inclined plane which is substantially parallel with the inclined centre line of the engine cylinder, and the triangle space has one corner pointing upwards when the machine has an upright position, a front side (53) facing the tool unit, a rear side (52), at least a top part of which is facing said inclined front side of the engine, and a base side (51) which faces said base line.

13. Machine according to claim 12, characterised in that the muffler substantially occupies said space having the substantial shape of a triangle in cross section.

14. Machine according to claim 12 or 13, characterised in that the contour of the muffler in said cross section has a point of balance (centre of gravity) having a position at a level which is lower than the level of the axis of rotation of the crankshaft, when the machine is in an upright position.

15. Machine according to claim 12, characterised in that at least 60% of a front side of the muffler faces the tool unit within a sector of a circle of 60 degrees, said sector ($\gamma$) having its centre in the centre of the tool, an upper border line which is horizontal, and a lower border line in a downwards-rearwards direction, when the machine is in an upraised position.

16. Machine according to claim 15, characterised in that the sector beneath said horizontal border line corresponds to a sector angle which is not smaller than 35 degrees.

17. Machine according to any of claims 15-16, characterised in that the front side (45) of the muffler is concave and that it is essentially parallel with the periphery of the tool within said sector.

18. Machine according to claim 12, characterised in that at least the main part of the upper part of a rear side (42) of the muffler faces and is essentially parallel with the inclined front side of the engine (11).

19. Machine according to claim 18, characterised in that a lower part of the rear side of the muffler faces and is essentially parallel with the front side of a member (43) extending in a substantially vertical direction under the crankcase.

20. Machine according to claim 12, characterised in that a rear bottom part (55) of the muffler protrudes rearwards under the crankcase.

21. Machine according to claim 1, characterised in that the contour of the muffler has a shape in cross section in a plane perpendicular to the axes of rotation of the tool and of the crankshaft, approximately corresponding to the contour of a pear.

22. Machine according to claim 1, characterised in that the centre line of the cylinder forms a angle ($\sigma$) of 10-45 degrees to a line extending between and defined by the foremost point of the top part of the machine unit and the foremost point of the muffler.

23. Machine according to claim 22, characterised in that the crankcase is accommodated in a space (67) above said rearward and forwards extending parts of the muffler and the fuel tank, respectively, and between said rear, forwards inclined side of the muffler and a front, rearwards inclined side of the fuel tank.

24. Machine according to claim 1, characterised in that a front bottom part (60) of the fuel tank protrudes forwards under the crankcase.

25. Machine according to claim 24, which is dependent on claim 1, characterised in that a front side (61) of the protruding part (60) of the fuel tank faces the rear side of the protruding muffler part (55).

26. Machine according to claim 25, characterised in that a heat insulation (64) is provided in a gap (63) between the lower parts of said front and rear sides of the fuel tank and muffler, respectably.

27. Machine according to claim 1, characterised in that said assembly (16) for supplying air and fuel to the engine are accommodated in a space (70) of the machine unit above the fuel tank and at the rear of the inclined cylinder block.

28. Machine according to claim 1, characterised in that a spark plug (6) of the internal combustion engine is located in the front top part of the machine unit, adjacent to the front top corner.

29. Machine according to claim 1, characterised in that the engine is a crankcase scavenged two-stroke engine and that additional air is supplied to the transfer channels from an air inlet (76) via at least one connecting duct (78).

* * * * *